(12) United States Patent
Satur

(10) Patent No.: US 9,321,169 B1
(45) Date of Patent: Apr. 26, 2016

(54) SAWHORSE BRACKET

(71) Applicant: Larry A. Satur, Gillette, WY (US)

(72) Inventor: Larry A. Satur, Gillette, WY (US)

(73) Assignee: Larry A. Satur, Gillette, WY (US)

(*) Notice: Subject to any disclaimer, the term of this patent is extended or adjusted under 35 U.S.C. 154(b) by 0 days.

(21) Appl. No.: 14/611,226

(22) Filed: Jan. 31, 2015

(51) Int. Cl.
F16M 11/38 (2006.01)
B25H 1/06 (2006.01)
F16B 9/00 (2006.01)
F16B 11/00 (2006.01)
F16B 5/08 (2006.01)

(52) U.S. Cl.
CPC .. *B25H 1/06* (2013.01); *F16B 5/08* (2013.01); *F16B 9/00* (2013.01); *F16B 11/00* (2013.01)

(58) Field of Classification Search
CPC ............ B25H 1/06; F16B 9/00; F16B 11/00; F16B 5/08
USPC ........... 248/164, 188.7, 188.8, 431, 432, 903; 182/153, 185.1, 186.1, 224
See application file for complete search history.

(56) References Cited

U.S. PATENT DOCUMENTS

| | | | |
|---|---|---|---|
| 302,945 A | 8/1884 | Sargent | |
| 1,780,579 A | 11/1930 | Crowley | |
| D177,888 S | 5/1956 | Wambach, Jr. | |
| 4,238,001 A * | 12/1980 | Alexander | B25H 1/06 16/263 |
| 5,377,780 A * | 1/1995 | Dunaway | B25H 1/06 182/185.1 |
| 5,836,365 A * | 11/1998 | Derecktor | B25H 1/06 108/131 |
| 6,123,173 A * | 9/2000 | Patros | B25H 1/06 182/129 |
| 6,612,401 B1 * | 9/2003 | Price | B25H 1/06 182/153 |
| 6,810,996 B2 | 11/2004 | Rump | |
| 7,481,254 B2 * | 1/2009 | Welsh | B25H 1/04 144/286.1 |
| 8,757,323 B2 | 6/2014 | Sutton et al. | |
| 8,807,498 B1 * | 8/2014 | McCoy | B27H 21/00 248/201 |
| 2002/0162704 A1 | 11/2002 | Rump | |
| 2003/0024604 A1 * | 2/2003 | Derecktor | B25H 1/06 144/286.5 |
| 2011/0233000 A1 | 9/2011 | Sutton et al. | |

* cited by examiner

*Primary Examiner* — Gwendolyn Baxter

(57) ABSTRACT

A sawhorse bracket comprising a U-channel and two rectangular tubes. The U-channel comprises two vertical plates joined together at their base by a first hollow square tube that is welded to the base of each of the first and second vertical plates at their front section and by a second hollow square tube that is welded to the base of each of the vertical plates at their rear section. The first and second square tubes are configured to create a gap between them at a base and in a center of the U-channel. The rectangular tubes are roughly centered on the outside surfaces of the vertical plates. The distal end of each of the rectangular tubes is open for receiving a piece of lumber. The long axis of the first and second rectangular tubes is oriented in the range of eight to fifteen degrees downward from a horizontal plane.

5 Claims, 4 Drawing Sheets

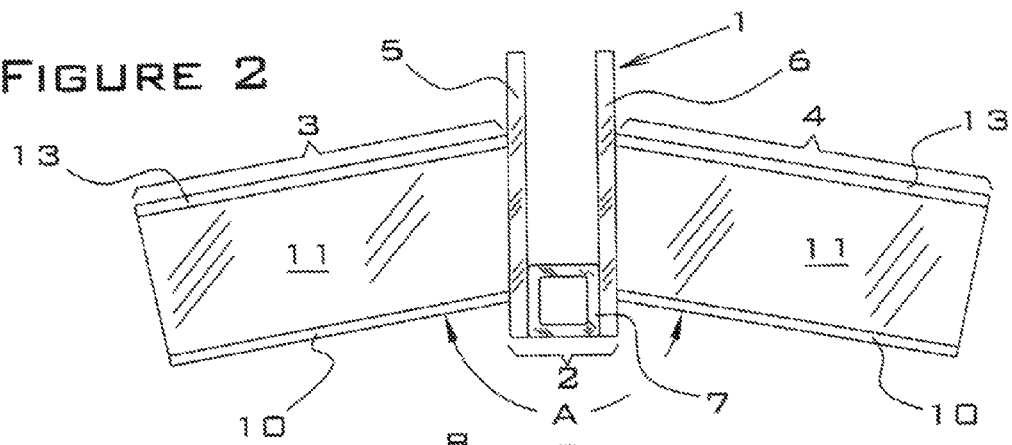
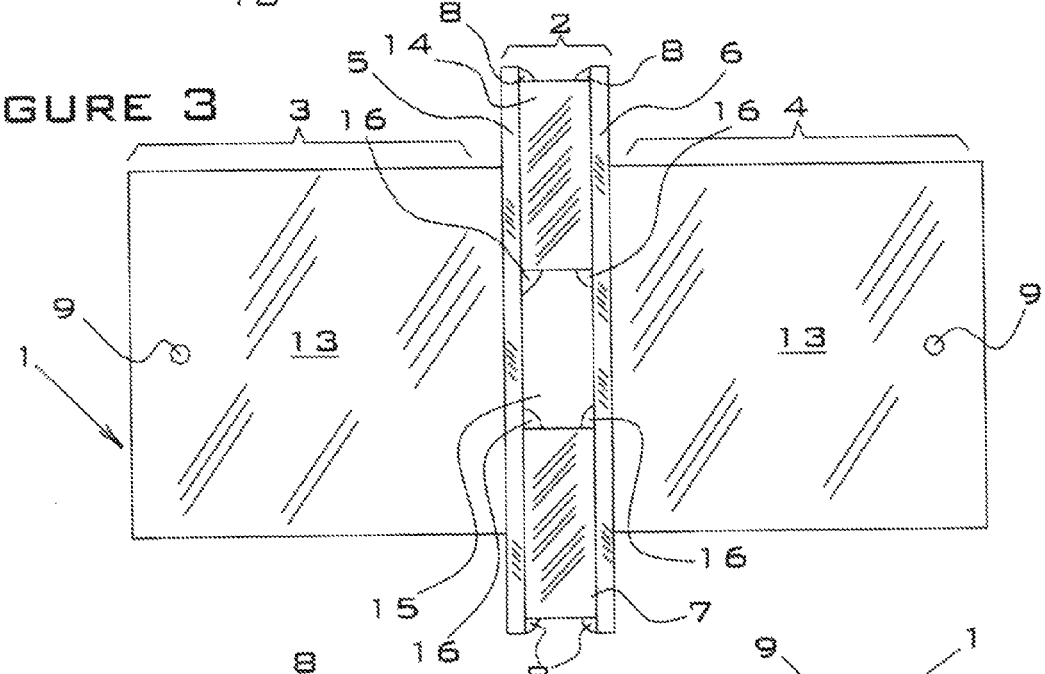
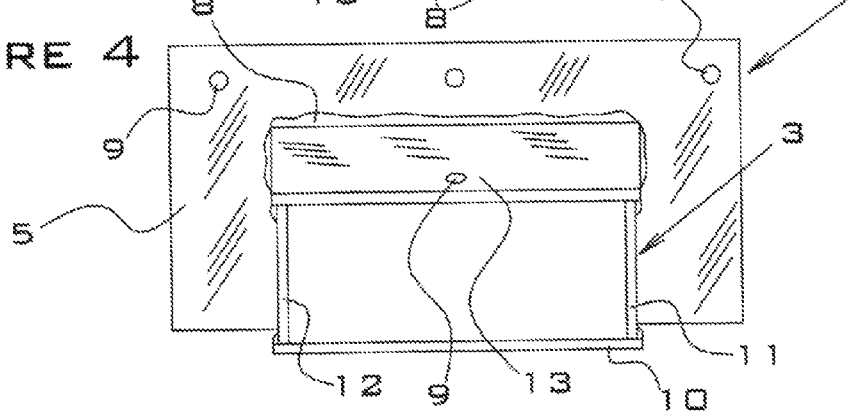

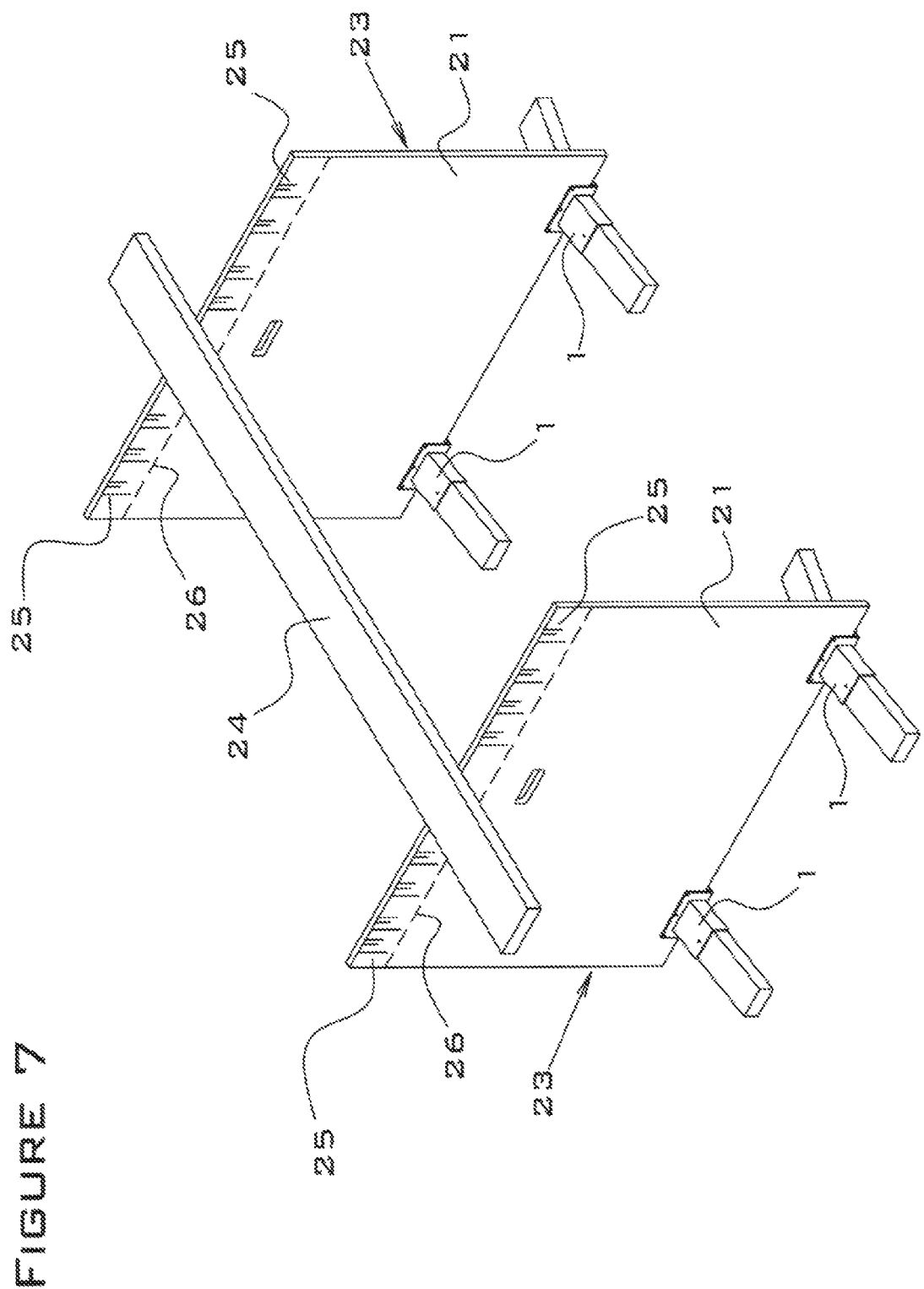

SAWHORSE BRACKET

BACKGROUND OF THE INVENTION

1. Field of the Invention

The present invention relates to sawhorse brackets, and more particularly, to a sawhorse bracket having leg supports that provide a highly divergent angle between the legs of a sawhorse assembly, and with the brackets designed to be positioned near the bottom of the sawhorse assembly.

2. Description of the Related Art

Although there are numerous examples of issued patents, patent applications, and non-patented commercial products that are designed to be used as sawhorse brackets, none of these inventions or products has a structure similar to the novel design of the present invention, nor do they function in the same way as the present invention.

U.S. Pat. No. 302,945 (Sargent, 1884) discloses a "supporting-horse" (sawhorse) having "cast in one piece" head-blocks (brackets), a top cushioning strip, clamps for the cushioning strip and wrought-iron brace-rods to provide support for the wooden legs. The angles of the legs are not specified.

U.S. Pat. No. 271,875 (Crowley, 1928) discloses an inexpensive sheet-metal sawhorse brace (bracket) with sockets to support the wooden legs. No dimensions for the socket angles are specified.

U.S. Pat. No. 2,506,389 (Samuelson, 1950) discloses a sawhorse bracket fabricated from sheet metal. Each bracket contains a pair of channels to support a pair of wooden legs, which are secured into the bracket with a nut-and-bolt assembly. The legs are detachable by loosening the nuts and sliding the bolts out of slots provided in the brackets. There is no description of the angle between the sawhorse legs.

U.S. Pat. No. 2,647,803 (Bohm, 1953) discloses a sawhorse connector bracket comprised of two similar pieces of stamped sheet metal that are riveted together. The assembly forms two channels for wooden legs and a seat for a cross piece. The angle between the sawhorse legs is not defined.

U.S. Pat. No. Des. 177,888 (Wambach, Jr., 1956) is an ornamental design for a sawhorse bracket that appears to have a rectangular channel on the top to hold a beam and a pair of receptacles on the bottom to hold legs that are round in cross section.

U.S. Pat. No. 3,036,657 (Ladue, 1962) discloses sawhorse bracket designed for quick assembly and takedown. The invention comprises a pair of multi-component leg pieces and a multi-component top piece. The pieces appear to be fabricated from sheet metal. The invention incorporates a brace or strap between the leg pieces in order to "assure rigidity of the legs . . . . " The angle between the legs is not defined, except for "a pair of legs 12 which extend from opposite sides of the beam 11 in downwardly divergent relation . . . . " (Col. 1, lines 54-55.)

U.S. Pat. No. 3,078,956 (Larson, 1963) discloses a collapsible sawhorse bracket assembly that comprises a pivot pin to allow the legs to be folded together for storage. The invention incorporates a gravity-actuated lock pin that maintains the legs in the outward position when the sawhorse is upright and the legs are spread apart.

U.S. Pat. No. 3,338,408 (Evans, 1966) discloses a display package that holds a pair of sawhorse brackets and comprises a simulated cross beam section fabricated from cardboard that is gripped in the brackets.

U.S. Pat. No. 3,349,869 (Evans, 1967) discloses a sawhorse bracket comprising two identical pieces of stamped sheet metal. The bottom sections of the two sheet-metal pieces are formed into channels for receiving 2×4-inch lumber legs, and a gap between the top sections of the two assembled pieces forms a channel to receive a wooden cross beam. The two pieces are connected together by a pair of hinges. A bolt-and-wing nut assembly is provided to tighten the top ends of the two pieces onto the cross beam. The angle between the two sawhorse legs is not defined, except as follows: "The legs diverge downwardly at a convenient stance angle, to ensure the requisite stability." (Col. 3, lines 31-33.)

U.S. Pat. No. 3,443,662 (Thompson, 1969) discloses a foldable sawhorse bracket assembly comprised of four pieces of sheet metal. To fold a sawhorse that comprises these brackets, the legs of the sawhorse are pivoted inward on pivot pins, and then the legs are moved closer together by a telescoping slide assembly attached between the leg bracket members. The angle between the sawhorse legs is not defined, except as "leg channels lie at a predetermined angle of divergence." (Col. 4, lines 22-23.)

U.S. Pat. No. 3,627,075 (Enders et al., 1971) discloses a sawhorse bracket assembly that is comprised of two identical, triangular shaped pieces that are firmed by stamping. The angle between the legs of a sawhorse assembled with this device is not defined.

U.S. Pat. No. 3,656,581 (Larson, 1972) discloses a sawhorse bracket assembly, wherein each assembly is comprised of a pair of triangular shaped face plates (main support brackets) and a pair of auxiliary brackets that fit between the face plates and a wooden cross beam. The angle between the legs of a sawhorse assembled with the brackets is described as "an angle of 33° between the equal length sides 24 thereof, for it has been found that at this angle the supporting legs 14 (FIG. 1) provide more strength and stability to the sawhorse or the like structure." (Col. 1, lines 43-46.)

U.S. Pat. No. 4,238,001 (Alexander, 1980) discloses a sawhorse bracket comprised of three metal members that are connected by a hinge pin that may be removed for disassembly of the three members. The sawhorse may be collapsed for transport or storage by pivoting the legs inward (toward each other). The angle between the legs when the legs are in the fully extended position is described as "not exceeding 45 degrees" and [column 3, lines 48-49]"preferably less than 45° and somewhere near 30°, although this value is not critical." (Col. 2, lines 57-58.)

U.S. Pat. No. 4,319,663 (Barden, 1982) discloses a foldable sawhorse with a shape optimized to hold logs that are being cut into lengths for firewood. The invention consists of wooden legs or wooden panels that are connected by hinges and pins. Unlike the present invention, this device does not comprise channels for holding legs or a vertical upright support board.

U.S. Pat. No. 4,461,370 (Connell, 1984) discloses a collapsible sawhorse bracket comprising three pieces of stamped metal. The leg members are U-shaped channels designed to fit 2×4-inch lumber, and the top member is designed to fit 2×6-inch or wider lumber. The leg members are attached to the top member with one bolt each. The bolts serve as pivot pins, which allow the legs to be collapsed (pushed inward toward each other) for compact storage of the assembled sawhorse and extended (pulled apart) when the sawhorse is used. There is no description of the angle between the leg members when the legs are in the extended or in the collapsed position.

U.S. Pat. No. 5,626,321 (Ulshafer, Jr., 1997) discloses an assembly for removably mounting a portable woodworking tool on the cross board of a sawhorse. This invention is dissimilar to the present invention in that it does not comprise receptacles for the attachment of legs and cannot be used to construct a sawhorse.

U.S. Pat. No. 5,913,381 (D'Armond, Jr., 1999) discloses a sawhorse bracket comprised of three rectangular, bent pieces of metal connected by bolts, wherein wooden board legs and a cross beam may inserted between the metal pieces, and the bolts may be tightened to lock the legs and cross beam into position. In a preferred embodiment, the metal pieces are fabricated from ³⁄₁₆-inch ASTM A36 steel. The angle between the leg supports is defined for this invention as follows: "[A]ngle β is approximately 45". In alternate embodiments, β typically may range from 30° to 60°. However, angles of less than 30° or more than 60° are intended to come within the scope of the present invention." (Col. 3, lines 15-17.)

U.S. Pat. No. 6,612,401 (Price et al., 2003) discloses a sawhorse and brackets wherein the brackets are manufactured from 14-gauge flat stock metal. This invention comprises an elevated cross beam that claims to prevent a saw blade from damaging the brackets or cross member. The elevated cross beam is a 2×4 (two inches by four inches) beam that is positioned on top of the main cross beam. The angle between the leg support channels is not specified.

U.S. Pat. No. 6,810,996 (Rump, 2004) discloses a bracket for sawhorses and other multiple piece stands such as roadside barricades that may constructed from either welded metal or molded plastic. The longitudinal axes of the channel and leg receptacles may be oriented at obtuse angles to each other. The angles between the two leg channels are not specified.

U.S. Pat. No. 8,757,323 (Sutton et al., 2014) discloses a sawhorse with a longitudinal channel that holds a wooden beam, which may be replaced when it has encountered excessive saw cuts or other damage. The invention may be constructed of molded plastic, wood, metal, other rigid materials or a combination of these materials. The invention comprises receptacles for insertable wooden legs. The receptacles "form a V shape," but the angle of the V is not specified.

U.S. Pat. No. 8,807,498 (McCoy et al., 2014) discloses a sawhorse bracket comprising three channel-shaped elements for receiving two support legs and a cross beam. A web brace is provided between the two support leg channels to prevent lateral spreading of the legs. The invention is preferably fabricated from 14-gauge, hot-rolled steel that is "sheared and formed." The angle between the legs appears to be 30 degrees based on the following description: "[T]he support leg bracket 16 channels are cut on a 15-degree angle cut and then welded to the bottom side of the retention flanges." (Col. 3, lines 58-60.)

All of the examples of prior art have one or more of the following disadvantages that are overcome by the present invention. Some (e.g., Sutton) are of a design that does not allow for adjustment of the distance between two adjacent brackets of an assembled sawhorse; many (e.g., McCoy et al., Price et al., Connell) are made of thin, stamped-out pieces of sheet metal or molded plastic that do not have the inherent structural strength of the welded plate steel of the present invention; and some (e.g., D'Armond), although made of plate steel are constructed of multiple pieces that must be manually adjusted and tightened during each assembly of the sawhorse.

BRIEF SUMMARY OF THE INVENTION

The present invention is a sawhorse bracket comprising: a U-channel comprising a first vertical plate and a second vertical plate, wherein the first and second vertical plates are parallel to one another, wherein each of the first and second vertical plates has a long axis that is parallel to a ground surface, and wherein the first and second vertical plates are joined together at a base of the first vertical plate and a base of the second vertical plate by a first square tube that is hollow and that is welded to the base of each of the first and second vertical plates at a front section of the first and second vertical plates and by a second square tube that is hollow and that is welded to the base of each of the first and second vertical plates at a rear section of the first and second vertical plates, the first and second square tubes being configured to create a gap between them at a base and in a center of the U-channel; and a first rectangular tube and a second rectangular tube, wherein the first rectangular tube is roughly centered on an outside surface of the first vertical plate and welded to the first vertical plate such that a distal end of the rectangular tube is open for receiving a piece of lumber, and wherein the second rectangular tube is roughly centered on an outside surface of the second vertical plate and welded to the second vertical plate such that a distal end of the rectangular tube is open for receiving a piece of lumber; wherein the U-channel forms an upwardly facing channel for receiving a piece of plywood; and wherein each of the first and second rectangular tubes has a long axis and a bottom surface, and wherein the long axis of each of the first and second rectangular tubes is oriented approximately ten degrees downward from a horizontal plane, thereby creating an angle of approximately one hundred sixty degrees between the bottom surface of the first rectangular tube and the bottom surface of the second rectangular tube.

In an alternate embodiment, the present invention is a sawhorse bracket comprising: a U-channel comprising a first vertical plate and a second vertical plate, wherein the first and second vertical plates are parallel to one another, wherein each of the first and second vertical plates has a long axis that is parallel to a ground surface, and wherein the first and second vertical plates are joined together at a base of the first vertical plate and a base of the second vertical plate by a first square tube that is hollow and that is welded to the base of each of the first and second vertical plates at a front section of the first and second vertical plates and by a second square tube that is hollow and that is welded to the base of each of the first and second vertical plates at a rear section of the first and second vertical plates, the first and second square tubes being configured to create a gap between them at a base and in a center of the U-channel; and a first rectangular tube and a second rectangular tube, wherein the first rectangular tube is roughly centered on an outside surface of the first vertical plate and welded to the first vertical plate such that a distal end of the rectangular tube is open for receiving a piece of lumber, and wherein the second rectangular tube is roughly centered on an outside surface of the second vertical plate and welded to the second vertical plate such that a distal end of the rectangular tube is open for receiving a piece of lumber; wherein the U-channel forms an upwardly facing channel for receiving a piece of plywood; and wherein each of the first and second rectangular tubes has a bottom surface and a long axis, and wherein the long axis of each of the first and second rectangular tubes is oriented in the range of eight to fifteen degrees downward from a horizontal plane, thereby creating an angle in the range of one hundred fifty to one hundred sixty-four degrees between the bottom surface of the first rectangular tube and the bottom surface of the second rectangular tube.

In a preferred embodiment, the first vertical plate of the U-channel comprises three evenly spaced holes along a top edge of the first vertical plate. Preferably, each of the first and second rectangular tubes comprises a top plate, and the top plate of each of the first and second rectangular tubes comprises a hole situated proximate to a distal edge of the top plate and roughly equidistant from either side of the top plate.

In yet another preferred embodiment, each of the first and second rectangular tubes comprises a top plate, a bottom plate, a first side plate, and a second side plate, each of the top plate, the bottom plate, and the first and second side plates has a thickness, and the thickness of the top plate is greater than the thickness of the bottom plate, greater than the thickness of the first side plate, and greater than the thickness of the second side plate.

BRIEF DESCRIPTION OF THE DRAWINGS

FIG. 2 is a front elevation view of the present invention.
FIG. 3 is a top plan view of the present invention.
FIG. 4 is a left elevation view of the present invention.
FIG. 7 is an isometric view of two sawhorse units used together to provide an elevated working surface to support a construction board that requires cutting.

REFERENCE NUMBERS

Figure 1:
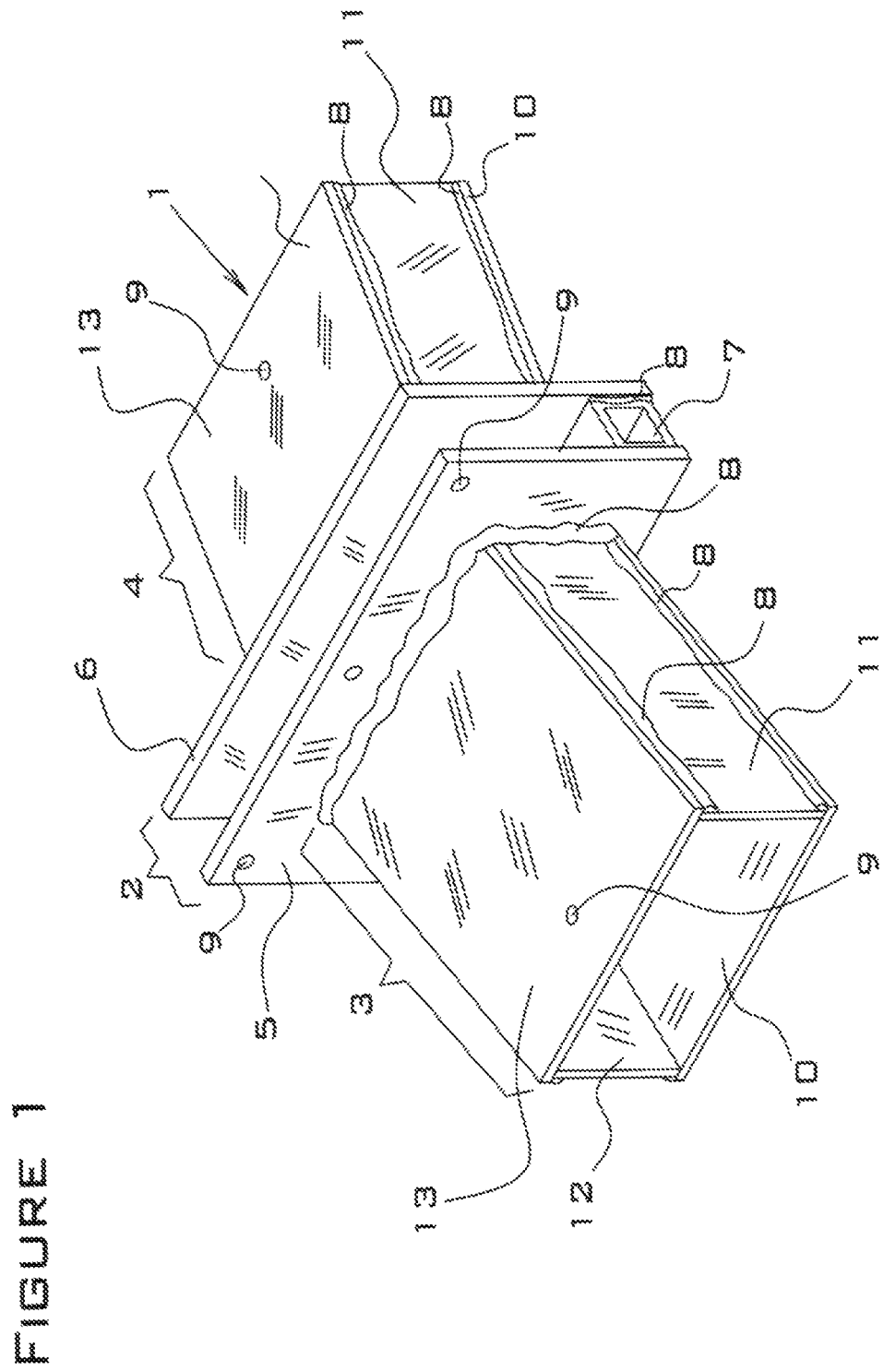
FIG. 1 is an isometric view of the present invention.

1 Sawhorse bracket, present invention
2 U-channel
3 Left rectangular tube
4 Right rectangular tube
5 Left plate of the U-channel
6 Right plate of the U-channel
7 Front square tubing of the U-channel
8 Weld
9 Hole
10 Bottom plate of a rectangular tube
11 Front side plate of a rectangular tube
12 Rear side plate of a rectangular tube
13 Top plate of a rectangular tube
14 Rear square tubing of the U-channel
15 Open space in the bottom of the U-channel
16 internal weld
17 First one-foot length of 2×4-inch lumber
18 Second one-foot length of 2×4-inch lumber
19 ¾-inch long decking screw
20 Sawhorse stand
21 Plywood sheet
22 Carrying handle in plywood sheet
23 Sawhorse assembly
24 Construction board
25 Sawcuts in the plywood sheets
26 Sawcut line

DETAILED DESCRIPTION OF INVENTION

The present invention is a novel metallic sawhorse bracket that is installed near ground level on a sawhorse assembly, in contrast to conventional metallic sawhorse brackets that are typically installed near the top end of a sawhorse assembly. The present invention results in a sawhorse assembly free of metallic components at the working surface, thereby positively eliminating possible damage to saw blades that might occur if the blades were to inadvertently come into contact with metal components of a sawhorse, as could occur with the sawhorse brackets of the prior art.

The present invention is comprised of one segment of U-channel and two rectangular tubes that are all welded together to form a single unit. In a standard application of the present invention, two sawhorse brackets comprising the present invention are attached to a single upright piece of sheet material such as plywood (in that the plywood is inserted into the U-channel), and each sawhorse bracket is also attached to two lengths of standard 2×4-inch lumber which serve as legs (in that the lumber is inserted into the rectangular tubes), thereby forming a novel sawhorse. Two of the assembled sawhorse units may be used in the conventional sawhorse manner, e.g., to form an elevated horizontal support for boards that are to be cut.

The U-channel of the present invention is oriented with its long axis parallel with the ground surface (i.e., horizontal), its short leg facing downward and in the horizontal plane, and its long legs (vertical plates) perpendicular to the ground surface (i.e., in the vertical plane). The open side of the U-channel faces upward so that it can receive and support a piece of upright sheet material, such as plywood, that is slid vertically downward into the U-channel. The left long leg of the U-channel has three identical 3/16-inch diameter holes installed across its length about 3/8-inch down from the top edge. In a preferred embodiment, the length of the U-channel along its long axis is approximately six inches, the height of the long legs is approximately three inches, and the inside width of the U-channel is approximately ¾-inch.

The two rectangular tubes of the present invention are positioned so as to be mirror images of each other when the present invention is viewed horizontally from either end of the U-channel. One rectangular tube is attached to the outside surface of each of the long legs of the U-channel, with the long axis of each rectangular tube oriented approximately ten degrees downward from the horizontal plane, thereby resulting in an angle between the bottom surfaces of the two rectangular tubes of approximately 160 degrees [180 degrees− (2×10) degrees]. The magnitude of this angle (depicted as Angle A in FIG. 2) between the two rectangular tubes of the present invention is significantly greater than the typical angle (about 30 to 60 degrees) of the leg receiver tubes of the prior art, and therefore provides a significant structural difference between the present invention and the prior art.

Each rectangular tube is oriented with its short sides perpendicular to the ground surface. Each rectangular tube has a 3/16-inch diameter hole installed in the top surface about 9/16-inch from its distal end and centered front-to-rear. When viewed horizontally from either end of the U-channel, the present invention is in the form of a wide, upside-down V shape, with the U-channel standing upright in the apex of the V formed by the two downward-sloping rectangular tubes. The two rectangular tubes serve as receivers for the wooden legs of the sawhorse, resulting in an angle of about 160 degrees between the wooden legs of the assembled sawhorse. In a preferred embodiment, the inside dimensions of the rectangular tubes are selected so that a standard 2×4-inch boards may be slipped inside of each rectangular tube for a snug fit, and the length of each rectangular tube is about four inches measured along the top surface of the rectangular tube from the proximal end (at the adjoining U-channel) to the distal end.

In a preferred embodiment, the U-channel is fabricated from two pieces of 3/16-inch thick steel plate and two pieces of ⅛-inch thick, ¾-inch square steel tubing. The two pieces of steel plate are 6-inch×3-inch and are oriented parallel to each other, with their short sides in the vertical plane and with a horizontal separation between the two pieces of ¾-inch. The two pieces of square tubing each have a length of approximately two inches and are positioned between the two pieces of steel plate. One piece of square tubing is positioned in the space between the front lower corners of the two steel plates, and the other piece of square tubing is positioned in the space between the rear lower corners of the two steel plates. The two pieces of square tubing are oriented with their long axes in the horizontal plane. The two pieces of square tubing are oriented so that the left and right sides of each square tubing piece butt up flat against the faces of the steel plate to which they are attached, thereby fixing the ¾-inch separation distance between the two steel plates. When viewed vertically downward from above, the U-channel piece that is produced by this procedure has an open section about two inches in length in the center of the short leg.

In this preferred embodiment, the two rectangular tubes are each comprised of four pieces of plate steel that are welded together, with the side and bottom pieces of the rectangular tubes comprised of 12-gauge (0.105-inch thick) steel and the top pieces of the rectangular tubes comprised of ⅛-inch thick steel. The extra thickness of the top plates, compared to the thickness of the side and bottom plates, reduces flexing of the bracket when the sawhorse assembly is subjected to a heavy top load, and thereby adds rigidity to the sawhorse assembly. The rectangular tubes are vertically positioned on the sides of the U-channel piece so that the top surface of each rectangular tube is located approximately ⅞-inch down from the top edge of the connecting vertical steel plate of the U-channel, and the bottom surface of each rectangular tube is located approximately ¼-inch up from the bottom edge of the connecting vertical steel plate of the U-channel. The two rectangular tubes are horizontally positioned on the sides of the U-channel so as to be centered on the sides of the U-channel from front to back.

FIG. 1 is an isometric view of the present invention, which is a sawhorse bracket 1. The sawhorse bracket 1 comprises three major segments, including a U-channel 2, a left rectangular tube 3 and a right rectangular tube 4. The U-channel 2 is comprised of a left plate 5, a right plate 6 and two pieces of square tubing, of which the front square tubing 7 is shown. Welds 8 attach the square tubing 7 to the left plate 5 and the right plate 6. There are three holes 9 in the left plate 5. The left rectangular tube 3 and the right rectangular tube 4 are identical in construction and are fabricated from a bottom plate 10, a front side plate 11, a rear side plate 12 and a top plate 13. The plates 10, 11, 12 and 13 are attached by welds 8 to form the rectangular tubes 3 and 4. The top plates 13 each contains a hole 9. The left rectangular tube 3 is attached to the left plate 5, and the right rectangular tube 4 is attached to the right plate 6 by welds 8.

FIG. 2 is a front elevation view of the present invention 1, showing the U-channel 2 that comprises a left plate 5, a right plate 6 and front square tubing 7, and also showing the left rectangular tube 3 and the right rectangular tube 4 that each comprises a bottom plate 10, a front side plate 11 and a top plate 13. Also shown is the angle A between the bottom of the left rectangular tube 3 and the right rectangular tube 4. In this figure, the welds have been removed for clarity.

FIG. 3 is a top plan view of the present invention 1, showing the U-channel 2, the left rectangular tube 3, and the right rectangular tube 4. As shown, the U-channel 2 comprises a left plate 5, a right plate 6, front square tubing 7 and rear square tubing 14. Also shown is the open space 15 that exists in the gap between the front square tubing 7 and the rear square tubing 14. The open space 15 provides room for applying the internal welds 16 that help attach the front square tubing 7 and the rear square tubing 14 to the left plate 5 and the right plate 6. The internal welds 16 provide extra structural strength to the U-channel 2.

FIG. 4 is a left elevation view of the present invention 1, showing the left plate 5 of the U-channel, and the bottom plate 10, the front side plate 11, the rear side plate 12, and the top plate 13 of the left rectangular tube 3. Also shown are welds 8 that attach the left rectangular tube 3 to the left plate 5 of the U-channel and the holes 9 in the top plate 13 and the left plate 5.

Figure 5:
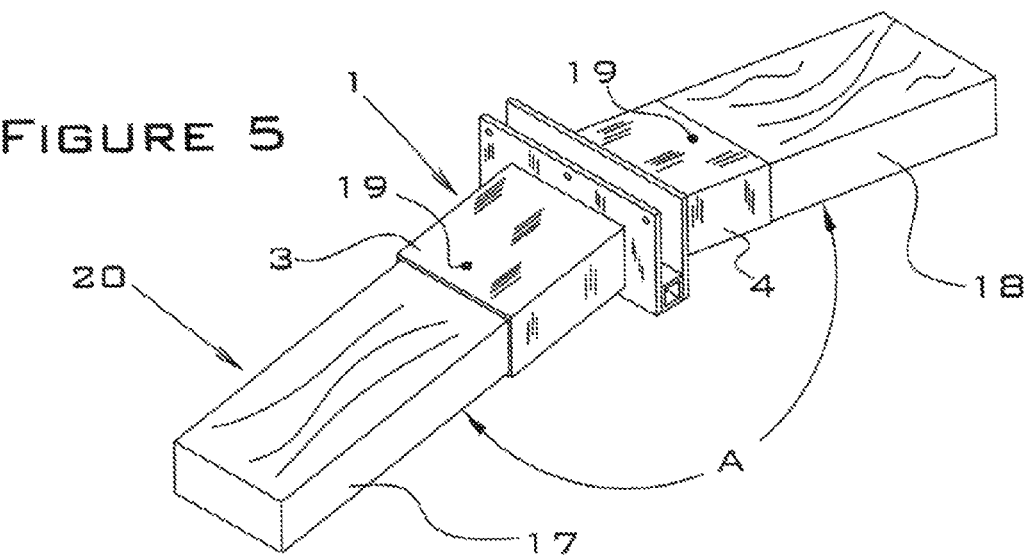
FIG. 5 is an isometric view of the present invention with a first one-foot length of 2×4-inch lumber slidably inserted into the left rectangular tube and a second one-foot length of 2×4-inch lumber slidably inserted into the right rectangular tube.

In the following FIGS. 5, 6 and 7, the welds have been removed for clarity. FIG. 5 is an isometric view of the present invention 1 with a first one-foot length of 2×4-inch lumber 17 slidably inserted into the left rectangular tube 3 and a second one-foot length of 2×4-inch lumber 18 slidably inserted into the right rectangular tube 4. Also shown are optional ¾-inch long decking screws 19 installed through holes 9 (shown in FIGS. 1 and 3) in the left rectangular tube 3 and the right rectangular tube 4 that are useful to keep the first 2×4-inch lumber 17 and the second 2×4-inch lumber 18 in place when the sawhorse assembly is transported. The assembly shown in FIG. 5 represents one sawhorse stand 20 of a standard two-stand sawhorse. The angle A is the divert angle between the legs of the sawhorse stand 20, in which the legs are formed from the first 2×4-inch lumber 17 and the second 2×4-inch lumber 18. The angle A is identical to the angle A shown in FIG. 2, and, as previously described, is about 160 degrees in a preferred embodiment.

Figure 6:
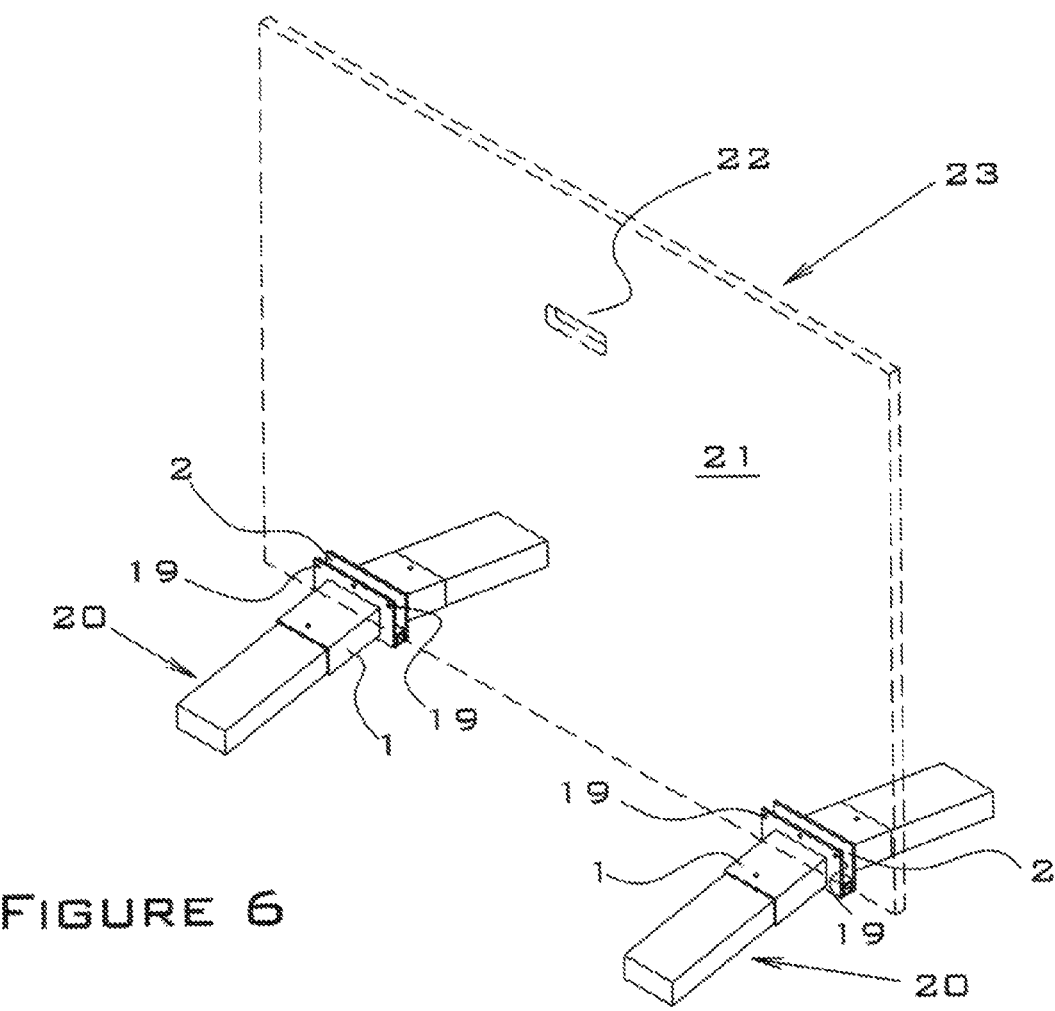
FIG. 6 is an isometric view of two units of the present invention being used in tandem to support a plywood sheet in an upright orientation.

FIG. 6 is an isometric view of two units of the present invention 1 being used in tandem to support a plywood sheet 21 in an upright orientation, with the plywood sheet 21 shown in phantom. Also shown is an optional carrying handle 22 that is installed in the plywood sheet 21 and optional ¾-inch decking screws 19 that have been inserted into holes 9 (shown in FIG. 1) in the U-channels 2 of the present invention and screwed into the plywood sheet 21, thereby securing the plywood sheet 21 to the two units of the present invention 1 when the assembly is transported. The assembly shown in FIG. 6 comprises two stands 20 and one upright plywood sheet 21 and represents one complete sawhorse assembly 23. As shown, the bottoms of the present invention 1 and the plywood sheet 21 are maintained in a position several inches above ground level when the sawhorse assembly 23 has been assembled. In a preferred embodiment, the plywood sheet is about four feet wide by three feet high.

FIG. 7 is an isometric view of two sawhorse assemblies 23 used together to provide an elevated working surface to support a construction board 24 that requires cutting. As shown, four units of the present invention 1 are utilized in this assembly. Also as shown, the sawhorse assemblies 23 contain no metal parts near the upper end of the plywood sheets 21 that could indivertibly damage a saw blade during the cutting of the board 24. It is possible, however, for a saw blade to inadvertently make contact with the plywood sheets 21 during cutting operations, as depicted by the multiple saw cuts 25 in the top edges of the plywood sheets 21. If the number of saw cuts 25 becomes excessive, the top few inches of the plywood sheets 21 may be removed by sawing, as illustrated by the dashed sawcut line 26, thereby restoring a smooth upper support surface and extending the working life of the plywood sheets 21.

Although the angle between the bottom surfaces of the two rectangular tubes (angle A of FIG. 2) is about 160 degrees in a preferred embodiment, the angle may range from about 150 to 164 degrees. Although the length of the 2×4-inch wooden legs is about 12 inches in a preferred embodiment, the length of the legs may range from about eight to 16 inches, and a pair of legs may have different lengths to provide a level sawhorse top surface with uneven ground elevations.

A single sawhorse assembly 23, as shown in FIG. 6, may be used as a barricade or signboard and, having a large vertical face, is better suited for these purposes than a conventional sawhorse. In an alternate application, four of these single-sawhorse assemblies 23 may be placed in a rectangle to provide an enclosure such as a playpen. Although the plywood sheet 21 is about four feet wide by three feet high in a preferred embodiment, larger pieces (for example, eight feet wide by three feet high) of sheet material may be utilized with the present invention.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A sawhorse bracket comprising:
   (a) a U-channel comprising a first vertical plate and a second vertical plate, wherein the first and second vertical plates are parallel to one another, wherein each of the first and second vertical plates has a long axis that is parallel to a ground surface, and wherein the first and second vertical plates are joined together at a base of the first vertical plate and a base of the second vertical plate by a first square tube that is hollow and that is welded to the base of each of the first and second vertical plates at a front section of the first and second vertical plates and by a second square tube that is hollow and that is welded to the base of each of the first and second vertical plates at a rear section of the first and second vertical plates, the first and second square tubes being configured to create a gap between them at a base and in a center of the U-channel; and
   (b) a first rectangular tube and a second rectangular tube, wherein the first rectangular tube is roughly centered on an outside surface of the first vertical plate and welded to the first vertical plate such that a distal end of the rectangular tube is open for receiving a piece of lumber, and wherein the second rectangular tube is roughly centered on an outside surface of the second vertical plate and welded to the second vertical plate such that a distal end of the rectangular tube is open for receiving a piece of lumber;
   wherein the U-channel forms an upwardly facing channel for receiving a piece of plywood; and
   wherein each of the first and second rectangular tubes has a long axis and a bottom surface, and wherein the long axis of each of the first and second rectangular tubes is oriented approximately ten degrees downward from a horizontal plane, thereby creating an angle of approximately one hundred sixty degrees between the bottom surface of the first rectangular tube and the bottom surface of the second rectangular tube.

2. A sawhorse bracket comprising:
   (a) a U-channel comprising a first vertical plate and a second vertical plate, wherein the first and second vertical plates are parallel to one another, wherein each of the first and second vertical plates has a long axis that is parallel to a ground surface, and wherein the first and second vertical plates are joined together at a base of the first vertical plate and a base of the second vertical plate by a first square tube that is hollow and that is welded to the base of each of the first and second vertical plates at a front section of the first and second vertical plates and by a second square tube that is hollow and that is welded to the base of each of the first and second vertical plates at a rear section of the first and second vertical plates, the first and second square tubes being configured to create a gap between them at a base and in a center of the U-channel; and
   (b) a first rectangular tube and a second rectangular tube, wherein the first rectangular tube is roughly centered on an outside surface of the first vertical plate and welded to the first vertical plate such that a distal end of the rectangular tube is open for receiving a piece of lumber, and wherein the second rectangular tube is roughly centered on an outside surface of the second vertical plate and welded to the second vertical plate such that a distal end of the rectangular tube is open for receiving a piece of lumber,
   wherein the U-channel forms an upwardly facing channel for receiving a piece of plywood; and
   wherein each of the first and second rectangular tubes has a bottom surface and a long axis, and wherein the long axis of each of the first and second rectangular tubes is oriented in the range of eight to fifteen degrees downward from a horizontal plane, thereby creating an angle in the range of one hundred fifty to one hundred sixty-four degrees between the bottom surface of the first rectangular tube and the bottom surface of the second rectangular tube.

3. The sawhorse bracket of claim 1 or 2, wherein the first vertical plate of the U-channel comprises three evenly spaced holes along a top edge of the first vertical plate.

4. The sawhorse bracket of claim 1 or 2, wherein each of the first and second rectangular tubes comprises a top plate, and wherein the top plate of each of the first and second rectangular tubes comprises a hole situated proximate to a distal edge of the top plate and roughly equidistant from either side of the top plate.

5. The sawhorse bracket of claim 1 or 2, wherein each of the first and second rectangular tubes comprises a top plate, a bottom plate, a first side plate, and a second side plate, wherein each of the top plate, the bottom plate, and the first and second side plates has a thickness, and wherein the thickness of the top plate is greater than the thickness of the bottom plate, greater than the thickness of the first side plate, and greater than the thickness of the second side plate.

* * * * *